(12) United States Patent
Gao et al.

(10) Patent No.: US 12,103,878 B2
(45) Date of Patent: Oct. 1, 2024

(54) BIOFILM COMPOSITE CARRIER AND PREPARATION METHOD AND USE THEREOF

(71) Applicant: Beijing University of Civil Engineering and Architecture, Beijing (CN)

(72) Inventors: Dawen Gao, Beijing (CN); Yuqi Li, Beijing (CN)

(73) Assignee: Beijing University of Civil Engineering and Architecture, Beijing (CN)

( * ) Notice: Subject to any disclaimer, the term of this patent is extended or adjusted under 35 U.S.C. 154(b) by 546 days.

(21) Appl. No.: 17/478,636

(22) Filed: Sep. 17, 2021

(65) Prior Publication Data
US 2022/0340461 A1 Oct. 27, 2022

(30) Foreign Application Priority Data
Apr. 23, 2021 (CN) .......................... 202110441809.8

(51) Int. Cl.
C02F 3/28 (2023.01)
C02F 101/16 (2006.01)
C08J 9/36 (2006.01)
C08J 9/40 (2006.01)
C08K 3/34 (2006.01)
C08K 3/38 (2006.01)
C09J 175/04 (2006.01)

(52) U.S. Cl.
CPC ............. *C02F 3/2806* (2013.01); *C08J 9/365* (2013.01); *C08J 9/40* (2013.01); *C08K 3/34* (2013.01); *C08K 3/38* (2013.01); *C09J 175/04* (2013.01); *C02F 2101/16* (2013.01); *C08J 2375/04* (2013.01)

(58) Field of Classification Search
CPC ...... C02F 2101/16; C02F 3/105; C02F 3/107; C02F 3/108; C02F 3/2806; C02F 3/30; C08G 2170/80; C08J 2375/04; C08J 2475/04; C08J 9/365; C08J 9/40; C08J 9/42; C08K 3/34; C08K 3/38
USPC ......................................................... 210/205
See application file for complete search history.

(56) References Cited

FOREIGN PATENT DOCUMENTS

| CN | 107185505 A | * | 9/2017 | ............ B01J 20/165 |
| CN | 111362396 A | * | 7/2020 | |

OTHER PUBLICATIONS

Zhong et al., CN 107185505 A, English machine translation, pp. 1-5 (Year: 2017).*
Li et al., CN 111362396 A, English Machine translation, pp. 1-6 (Year: 2020).*

* cited by examiner

Primary Examiner — Claire A Norris
(74) Attorney, Agent, or Firm — Resolute Legal PLLC (57) ABSTRACT

A biofilm composite carrier and a preparation method and use thereof are provided. The biofilm composite carrier includes a polyurethane framework, an adhesive and a functional material, wherein the functional material is adhered to the surface and pores of the polyurethane framework through the adhesive, and the functional material is a mixture of zeolite and tourmaline. The biofilm composite carrier is beneficial to the quick start-up and stable operation of the municipal sewage deammonification system under conditions of low temperature and low ammonium.

9 Claims, 9 Drawing Sheets

BIOFILM COMPOSITE CARRIER AND PREPARATION METHOD AND USE THEREOF

CROSS REFERENCE TO RELATED APPLICATION

This application claims the benefit and priority of Chinese Patent Application No. 202110441809.8 filed on Apr. 23, 2021, the disclosure of which is incorporated by reference herein in its entirety as part of the present application.

TECHNICAL FIELD

The present disclosure relates to the technical field of municipal sewage deammonification, and in particular to a biofilm composite carrier and a preparation method and use thereof.

BACKGROUND ART

The deammonification process is a sewage nitrogen removal treatment process based on the mechanism of anaerobic ammonia oxidation, which combines a PN (partial nitrification) and an Anammox (anaerobic ammonia oxidation) together. PN is guided by ammonia oxidizing bacteria (AOB), during which $NH_4^+$—N is converted into $NO_2^-$—N for providing essential substrate for the subsequent Anammox. Then anaerobic ammonia oxidizing bacteria (AnAOB) directly convert $NH_4^+$—N and $NO_2^-$—N into nitrogen gas, thus realizing sewage nitrogen removal. At present, the deammonification process has been widely applied in the treatment of ammonium-rich and sewage with low C/N ratio, such as landfill leachate and sludge digestion supernatant. Due to the low temperature and low ammonia-nitrogen characteristics of municipal sewage, it is difficult to apply the deammonification process to the nitrogen removal treatment of municipal sewage. Therefore, it has become the main difficulties in quick start-up and stable operation of the deammonification process in the nitrogen removal treatment of municipal sewage about how to solve the problems of low activity of the deammonification functional bacteria and difficulty in inhibiting nitrite-oxidizing bacteria (NOB) under the conditions of low temperature, low ammonia-nitrogen and fluctuating influent.

The AOB and AnAOB are autotrophic bacteria with slow growth rate. Whether they can be effectively retained is the key to the successful start-up and stable operation of the deammonification system. Due to the wall-growth characteristic of the AnAOB, it is possible to effectively improve the retention capacity of the functional bacteria in the reactor by adding proper carriers. Biofilms and granular sludge are two most commonly used fillers in deammonification processes. Therefore, the selection of fillers is of vital importance to the study of deammonification processes, and both inorganic materials and organic materials are widely studied as the microorganism carriers for the deammonification process.

Among others, inorganic carriers such as volcanic rock, limestone, zeolite, and tourmaline have advantages of high mechanical strength, low cost, and easy availability. However, due to the characteristics of the inorganic fillers, using them in the reactor would often cause problems such as blockage, and particularly, the presence of a large number of organic matters in the influent would accelerate the excessive proliferation of heterotrophic bacteria in the system, resulting in an excessive proliferation of biofilm in the system and blockage of the filler gap. The filler blockage may greatly prevent the mass transfer of the substrate and oxygen in the system, thereby influencing the treatment efficiency of the Anammox reactor. Polymer carriers, such as polyurethane sponge, non-woven fabrics, BioCube sponge, K-type filler, and semi-soft filler, are also widely used in sewage treatment. In many reaches, they are used as a microorganism carrier for immobilizing AOB and AnAOB bacteria. The polymer organic carriers have advantages of large specific surface area, high mechanical strength, low density and the like, but have weak microorganism attachment capacity. Natural organic materials such as biochar and corncobs have larger specific surface area and high porous structure, are low in cost and could realize resource utilization of wastes. However, it has been shown that the natural organic materials are not fully favorable for the growth and proliferation of AnAOB, this is because the carrier materials may promote the activity of denitrifying bacteria.

Obviously all the above materials have certain disadvantages as fillers of the deammonification system. Therefore, it is urgent to develop a novel biofilm composite carrier which is suitable for enhancing the start-up and stable operation of the deammonification system under conditions of low temperature and low ammonium, so as to promote the application and popularization of the deammonification process in the nitrogen removal treatment of municipal sewage.

SUMMARY

An object of the present disclosure is to provide a biofilm composite carrier and a preparation method and use thereof. The biofilm composite carrier is beneficial to the quick start-up and stable operation of the deammonification system for municipal sewage under the conditions of low temperature and low ammonia-nitrogen.

In order to achieve the above object, the present disclosure provides the following technical solutions:

The present disclosure provides a biofilm composite carrier, comprising a polyurethane framework, an adhesive and a functional material, wherein the functional material is adhered to the surface and pores of the polyurethane framework through the adhesive, and the functional material is a mixture of zeolite and tourmaline.

In some embodiments, a ratio of the volume of the polyurethane framework to the mass of the adhesive to the mass of the functional material is in a range of 1 $cm^3$:(0.015-0.025) g:(0.1-0.2) g.

In some embodiments, the zeolite in the mixture of zeolite and tourmaline is Na-pretreated zeolite, and the adhesive is waterborne polyurethane.

In some embodiments, a mass ratio of the zeolite to the tourmaline in the mixture of zeolite and tourmaline is in a range of (1-3):1.

The present disclosure also provides a method for preparing the biofilm composite carrier described in the above technical solutions, comprising the following steps:

mixing a zeolite powder and a tourmaline powder to obtain a zeolite-tourmaline mixed powder;

mixing the zeolite-tourmaline mixed powder with an adhesive solution to obtain a functional carrier adhesive; and placing the polyurethane framework in the functional carrier adhesive and impregnating, removing residual liquid, then placing the polyurethane framework obtained after removing residual liquid in the zeolite-tourmaline mixed powder, and adhering the zeolite-tourmaline mixed powder to obtain the biofilm composite carrier.

In some embodiments, the method further comprises subjecting the zeolite powder to a pretreatment before mixing the zeolite powder and the tourmaline powder, and the pretreatment comprises soaking the zeolite powder in a sodium chloride solution for an activation.

In some embodiments, the zeolite powder has a particle size of 200-800 meshes;
the sodium chloride solution has a temperature of 70-100° C., and a concentration of 1-1.5 mol/L;
a ratio of the mass of the zeolite powder to the volume of the sodium chloride solution is in a range of (15-25) g:100 mL.

In some embodiments, a mass ratio of the zeolite powder to the tourmaline powder is in a range of (1-3):1.

In some embodiments, the adhesive solution is a waterborne polyurethane solution;
the waterborne polyurethane solution has a concentration of 30±2% by mass; and
a mass ratio of the zeolite-tourmaline mixed powder to the waterborne polyurethane solution is in a range of 1:(5-10).

The present disclosure also provides use of the biofilm composite carrier described in the above technical solution or prepared by the method described in the above technical solution in the field of enhancing the municipal sewage deammonification.

The present disclosure provides a biofilm composite carrier, which comprises a polyurethane framework, an adhesive and a functional material, wherein the functional material is adhered to the surface and pores of the polyurethane framework through the adhesive, and the functional material is a mixture of zeolite and tourmaline. The biofilm composite carrier according to the present disclosure is formed by adhering a mixture of zeolite and tourmaline onto a polyurethane framework. Based on the high selective adsorption capacity to $NH_4^+$—N, zeolite could form a $NH_4^+$—N microenvironment which is suitable for growth of deammonification functional bacteria on the surface of the carrier, and also plays a buffering role to further stabilize the quality of effluent when the ammonium concentration of the influent fluctuates. The characteristic that tourmaline could form a spontaneous micro electric field is combined to stimulate the formation of a biofilm, thus solving the problem of low biomass of deammonification functional bacteria under the conditions of low temperature and low ammonium; the polyurethane framework has a porous space structure, which provides more space for the growth of the functional bacteria, and results in forming a dissolved oxygen concentration gradient from inside to outside, thereby providing a proper dissolved oxygen environment for AnAOB, and also solving the problems of aggregation of zeolite and tourmaline filler particles and biological blockage. Using the biofilm composite carrier as a filler is favorable for the quick start-up and stable operation of the deammonification system for municipal sewage under the conditions of low temperature and low ammonium. The biofilm composite carrier according to the present disclosure has great advantages in the aspects of improving the biomass of the deammonification functional bacteria, retaining AnAOB, providing a proper dissolved oxygen environment, avoiding filler blockage and the like. In practical application, by combining with NOB inhibition strategies such as dissolved oxygen limitation and periodic sludge discharge, the method makes it possible to effectively shorten the start-up time of the deammonification system and guarantee the stable operation of the system, and has important significance for the popularization of the process in the nitrogen removal treatment of municipal sewage.

DETAILED DESCRIPTION OF THE EMBODIMENTS

Figure 1:
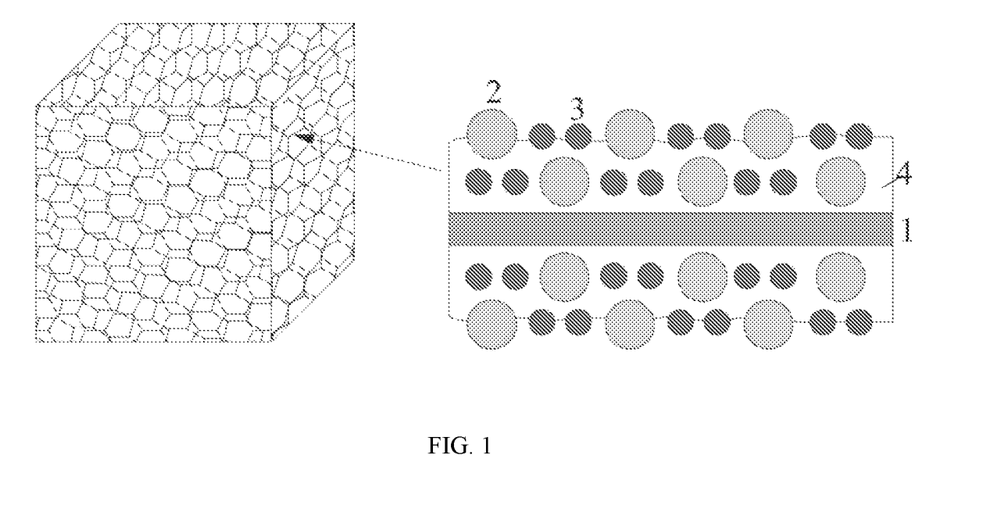
FIG. 1 is a structural schematic diagram of a biofilm composite carrier according to the present disclosure, in which 1 represents polyurethane framework, 2 represents zeolite, 3 represents tourmaline and 4 represents adhesive.

The present disclosure provides a biofilm composite carrier, comprising a polyurethane framework, an adhesive and a functional material, wherein the functional material is adhered to the surface and pores of the polyurethane skeleton through the adhesive, as shown in FIG. 1, and
the functional material is a mixture of zeolite and tourmaline.

In the present disclosure, there is no special limitation on the pore structure of the polyurethane framework. In some embodiments, the polyurethane framework is polyurethane sponge.

In some embodiments, the adhesive is waterborne polyurethane. In the present disclosure, there is no special limitation on the type of the waterborne polyurethane, and any waterborne polyurethane that could play a role of adhesion well known to those skilled in the art may be used.

In the present disclosure, the functional material is a mixture of zeolite and tourmaline. In some embodiments, the zeolite in the mixture of the zeolite and the tourmaline has a particle size not larger than 200 meshes, preferably 200-800 meshes. In some embodiments, the zeolite is Na-pretreated zeolite. In some embodiments, the tourmaline in the mixture of zeolite and tourmaline has a particle size of 200-800 meshes, preferably 400-600 meshes; in some embodiments, the tourmaline is iron tourmaline.

In some embodiments, a mass ratio of the zeolite to the tourmaline is in a range of (1-3):1, preferably (1.5-2.5):1, and more preferably (1.8-2.2):1.

In some embodiments, a ratio of the volume of the polyurethane framework to the mass of the adhesive to the mass of the functional material is in a range of 1 $cm^3$:(0.015-0.025) g:(0.1-0.2) g, preferably 1 $cm^3$:(0.016-0.023) g:(0.13-0.19) g, and more preferably 1 $cm^3$:(0.018-0.02) g:(0.15-0.16) g.

The present disclosure also provides a method for preparing the biofilm composite carrier described in the above technical solutions, which comprises the following steps:

- mixing a zeolite powder and a tourmaline powder to obtain a zeolite-tourmaline mixed powder;
- mixing the zeolite-tourmaline mixed powder with an adhesive solution to obtain a functional carrier adhesive; and
- placing the polyurethane framework in the functional carrier adhesive and impregnating, removing residual liquid, placing the polyurethane framework obtained after removing residual liquid in the zeolite-tourmaline mixed powder, and adhering the zeolite-tourmaline mixed powder to obtain the biofilm composite carrier.

In the present disclosure, all the raw materials are commercially available products well known to those skilled in the art, unless otherwise specified.

In the present disclosure, the zeolite powder and the tourmaline powder are mixed to obtain the zeolite-tourmaline mixed powder.

In some embodiments, the method further comprises subjecting the zeolite powder to a pretreatment before mixing the zeolite powder and the tourmaline powder; in some embodiments, the pretreatment comprises soaking the zeolite powder in a sodium chloride solution for an activation.

In some embodiments, the zeolite powder has a particle size of 200-800 meshes, preferably 400-600 meshes. In some embodiments, the sodium chloride solution has a temperature of 70-100° C., preferably 70-90° C., and more preferably 70-80° C. In some embodiments, the sodium chloride solution has a concentration of 1-1.5 mol/L, preferably 1-1.3 mol/L.

In some embodiments, a ratio of the mass of the zeolite powder to the volume of the sodium chloride solution is in a range of (15-25) g:100 mL, preferably (15-23) g:100 mL, and more preferably (17-20) g:100 mL.

In some embodiments, the activation is conducted for 0.5-2 h, preferably 1-1.5 h.

In some embodiments, the zeolite powder is a porous aluminate crystal with a skeleton structure, which has a plurality of pore passages and channels inside, and exhibits strong ion exchange capacity, especially ammonia ion exchange capacity which is sequenced in front, so that the zeolite powder has high selective adsorption capacity on ammonium. However, impurities such as water and organic matters often exist in pores and channels of natural zeolite, which will reduce the pore space. The above pretreatment could effectively remove the impurities in the pores and the channels of the natural zeolite. Meanwhile, ion exchange volume could be improved by replacing the impurities in the pores and the channels of the zeolite with sodium ions which have a smaller ionic radius in the soaking of a sodium chloride solution, thus improving the selective adsorption capacity on ammonium.

In some embodiments, the method further comprises after the activation, subjecting the activated zeolite to a washing, a drying, a grinding and a sieving in sequence. In some embodiments, the washing is conducted by washing the activated zeolite with distilled water to neutral. In some embodiments, the drying is conducted at 105° C. for 24 h. In some embodiments, the drying is conducted by baking; the baking is conducted in an oven. In the present disclosure, there is no special limitation on the process of grinding, and any process well known to those skilled in the art may be used. In some embodiments, the sieving is conducted with a screen with a mesh number of 200 meshes.

In some embodiments, the tourmaline powder has a particle size of 200-800 meshes, preferably 300-800 meshes, and more preferably 500-600 meshes. In some embodiments, the tourmaline powder is iron tourmaline powder.

In some embodiments, a mass ratio of the zeolite powder to the tourmaline powder is in a range of (1-3):1, preferably (1.5-3):1, and more preferably (2.2-2.7):1.

In some embodiments, the mixing of the zeolite powder and the tourmaline powder is conducted by oscillation; the oscillation is conducted at an oscillation speed of 3200 rpm/min, and the oscillation is conducted for 20 min; the oscillation is conducted in a high-speed oscillator.

After the zeolite-tourmaline mixed powder is obtained, the zeolite-tourmaline mixed powder is mixed with an adhesive solution to obtain a functional carrier adhesive.

In some embodiments, the adhesive solution is a waterborne polyurethane solution; the waterborne polyurethane solution has a concentration of 30±2% by mass; a mass ratio of the zeolite-tourmaline mixed powder to the waterborne polyurethane solution is in a range of 1:(5-10), preferably 1:(6-10), and more preferably 1:(7-9).

In some embodiments, the mixing of the zeolite-tourmaline mixed powder and adhesive solution is conducted by stirring; the stirring is conducted at a rotating speed of 120 rpm/min, and the stirring is conducted for 2 min; the stirring is conducted in a magnetic stirrer.

After the functional carrier adhesive is obtained, the polyurethane framework is placed in the functional carrier adhesive and impregnated; after residual liquid is removed, the resulting polyurethane framework is placed in the zeolite-tourmaline mixed powder, and the zeolite-tourmaline mixed powder is adhered to said polyurethane framework to obtain the biofilm composite carrier.

In some embodiments, the polyurethane framework is polyurethane sponge, and the polyurethane sponge is a cube with the a side length of 1-3 cm.

In some embodiments, before the polyurethane framework is placed in the functional carrier adhesive and impregnated, the polyurethane framework is subjected to a pretreatment. In some embodiments, the pretreatment comprises washing and drying in sequence; the washing is conducted by washing with distilled water for three times; the drying is conducted at 75° C. for 24 h; in some embodiments, the drying is conducted by baking, and the baking is conducted in a drying oven.

In some embodiments, a ratio of the volume of the polyurethane framework to the mass of the functional carrier adhesive is in a range of (1-27) cm$^3$:(0.015-0.675) g, preferably (1-27) cm$^3$:(0.02-0.54) g.

In some embodiments, the residual liquid is removed by absorbing the residual liquid inside the polyurethane framework and on the surface of the polyurethane framework using a filter paper.

In some embodiments, the process of placing the polyurethane framework in the zeolite-tourmaline mixed powder and adhering the zeolite-tourmaline mixed powder to the polyurethane framework is conducted by means of pressing and/or kneading to sufficiently contact and uniformly adhere the interior and surface of the polyurethane framework with the powder.

In some embodiments, the zeolite-tourmaline mixed powder is loaded in two steps, which could adhere more mixed powder.

In some embodiments, the method further includes after the adhesion is completed, subjecting the resulting polyurethane framework to a post-treatment; subjecting the resulting polyurethane framework to the post-treatment comprises: subjecting the resulting polyurethane framework to an oscillating, a blowing off, a first drying, a washing and a second drying in sequence. In some embodiments, the oscillating is conducted at an oscillation speed of 200 rpm/min, and the oscillating is conducted for 2 h; the oscillating is conducted in an oscillator. In some embodiments, the blowing off is conducted by means of air stripping at ambient temperature; the blowing off is to remove the excessive zeolite-tourmaline mixed powder in the pores of the polyurethane framework. In some embodiments, the first drying and the second drying are conducted at 75° C. for 24 h; the first drying and the second drying are conducted by baking, and the baking is conducted in an oven. In some embodiments, the washing is conducted by soaking in distilled water.

The present disclosure also provides use of the biofilm composite carrier described in the above technical solution or prepared by the method described in the above technical solution in the field of enhancing municipal sewage deammonification. In some embodiments, the biofilm composite carrier is used as a filler for enhancement of municipal sewage deammonification system.

In some embodiments, a method for enhancing municipal sewage deammonification comprises the following steps:
  introducing municipal sewage into a packed bed reactor with a filler for nitrogen removal, wherein the filler is the biofilm composite carrier described in the above technical solution or prepared by the method described in the above technical solution.

In some embodiments, the biofilm composite carrier filled in the packed bed reactor accounts for 15-45%, preferably 20-40% of the volume of the packed bed reactor.

In some embodiments, the municipal sewage has an ammonium concentration of less than 50 mg $N \cdot L^{-1}$.

In some embodiments, a hydraulic retention time of the municipal sewage is in a range of 6.6-11.3 h, preferably 7-10 h. The municipal sewage has a total nitrogen load of 0.1-0.2 kg $N\ (m \cdot d)^{-1}$, preferably 0.13-0.16 kg $N\ (m \cdot d)^{-1}$.

In some embodiments, the nitrogen removal is conducted under conditions of: a temperature of 33±3° C.; a pH of 8.0±0.3; a dissolved oxygen concentration of 0.1 mg $O_2 \cdot L^{-1}$; a reflux ratio of (1-10):1, preferably (3-7):1, and more preferably (5-6):1; an aeration rate of 0-6 mL/min, an aeration time of 4-15 min, an aeration stopping time of 15-26 min, and aeration and no-aeration are alternately conducted; the nitrogen removal is conducted in dark.

In the present disclosure, there is no special limitation on the packed bed reactor, and any packed bed reactor well known to those skilled in the art may be used. In a specific embodiment of the present disclosure, the packed bed reactor is an upflow packed bed reactor with a height of 39 cm, an inner diameter of 7 cm, a total volume of 1.5 L, and an effective capacity of 1.3 L.

The biofilm composite carrier and preparation method and use thereof provided by the present disclosure will be described in detail with reference to examples below, but they should not be construed as limiting the protection scope of the present disclosure.

EXAMPLE 1

15 g of 200-mesh zeolite powder was added into 100 mL of a NaCl solution with a temperature of 70° C. and a concentration of 1 mol/L, and soaked for 2 h for an activation. The resulting zeolite powder after the activation was elutriated to be neutral with distilled water, baked in an oven at a temperature of 105° C. for 24 h, ground by a grinder, and then sieved through a 200-mesh screen, obtaining a Na-pretreated zeolite powder.

22.5 g of the Na-pretreated zeolite powder and 7.5 g of 800-mesh tourmaline powder were mixed in a high-speed oscillator at an oscillation rate of 3200 rpm/min for 20 min, obtaining a zeolite-tourmaline mixed powder.

A polyurethane sponge with a side length of 1 cm was washed with distilled water for three times, and baked in an oven at 75° C. for 24 h, obtaining a pretreated polyurethane sponge;
  3 g of the zeolite-tourmaline mixed powder and 30 g of a waterborne polyurethane solution with a concentration of 30±2% by mass were mixed in a magnetic stirrer at a rotating speed of 120 rpm/min for 2 min, obtaining a functional carrier adhesive.

The pretreated polyurethane sponge with a volume of 200 $cm^3$ is placed in 33 g of the functional carrier adhesive, fully impregnated, and taken out. Residual liquid inside and on the surface of the polyurethane sponge was sucked by a filter paper, and the resulting polyurethane sponge was then placed in the zeolite-tourmaline mixed powder, squeezed and/or kneaded to fully contact the inside and surface thereof with the zeolite-tourmaline mixed powder and uniformly adhere the zeolite-tourmaline mixed powder to the polyurethane sponge, and then taken out. The resulting material was oscillated by using a shaker at the oscillation speed of 200 rpm/min for 2 h, then blowed off by means of air stripping at ambient temperature to take out residual powder in pores, dried in an oven at 75° C. for 24 h, washed with distilled water to clean floating powder, and then dried in an oven at 75° C. for 24 h, obtaining a biofilm composite carrier (which had a loading of the zeolite-tourmaline mixed powder of 0.15 $g/cm^3$, a mass ratio of the Na-pretreated zeolite to the tourmaline of 3:1, and a loading of the waterborne polyurethane of 0.015 $g/cm^3$).

EXAMPLE 2

This example was conducted in procedures similar to those of Example 1, and the obtained biofilm composite carrier had a loading of the zeolite-tourmaline mixed powder of 0.17 $g/cm^3$, a mass ratio of the Na-pretreated zeolite to the tourmaline of 2:1, and a loading of the waterborne polyurethane of 0.019 $g/cm^3$.

EXAMPLE 3

This example was conducted in procedures similar to those of Example 1, and the obtained biofilm composite carrier had a loading of the zeolite-tourmaline mixed powder of 0.16 $g/cm^3$, a mass ratio of the Na-pretreated zeolite to the tourmaline of 2:1, and a loading of the waterborne polyurethane of 0.018 $g/cm^3$.

EXAMPLE 4

This example was conducted in procedures similar to those of Example 1, and the obtained biofilm composite carrier had a loading of the zeolite-tourmaline mixed powder of 0.16 $g/cm^3$, a mass ratio of the Na-pretreated zeolite to the tourmaline of 1:1, and a loading of the waterborne polyurethane of 0.018 $g/cm^3$.

EXAMPLE 5

This example was conducted in procedures similar to those of Example 1, and the obtained biofilm composite carrier had a loading of the zeolite-tourmaline mixed powder of 0.17 g/cm³, a mass ratio of the Na-pretreated zeolite to the tourmaline of 1:1, and a loading of the waterborne polyurethane of 0.019 g/cm³.

EXAMPLE 6

This example was conducted in procedures similar to those of Example 1, and the obtained biofilm composite carrier had a loading of the zeolite-tourmaline mixed powder of 0.18 g/cm³, a mass ratio of the Na-pretreated zeolite to the tourmaline of 1:1, and a loading of the waterborne polyurethane of 0.020 g/cm³.

Comparative Example 1

A polyurethane sponge with a side length of 1 cm was washed with distilled water for three times, and dried in an oven at 75° C. for 24 h, obtaining a treated polyurethane sponge.

Comparative Example 2

Figure 2:
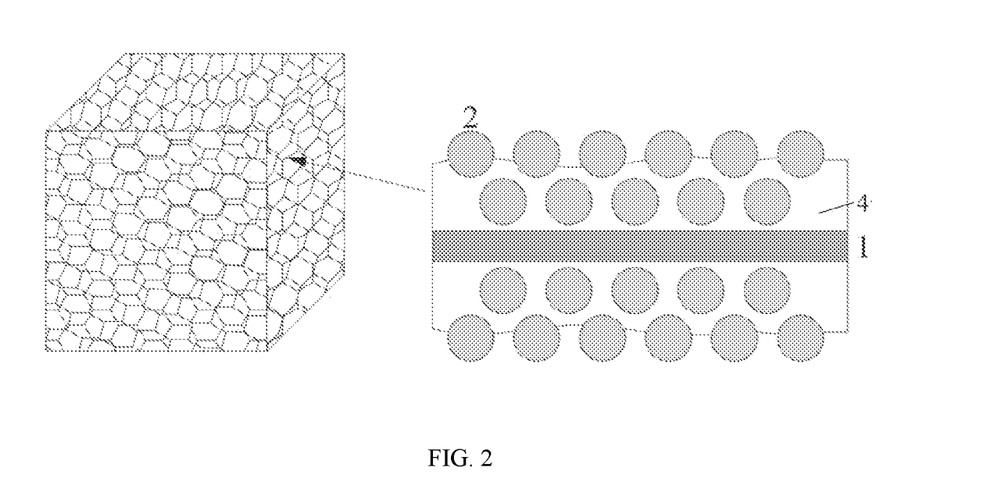
FIG. 2 is a structural schematic diagram of a zeolite-polyurethane sponge carrier according to Comparative Example 2, in which 1 represents polyurethane framework, 2 represents zeolite, and 4 represents adhesive.

This comparative example was conducted as described in Example 1, except that no tourmaline powder was added, and the obtained zeolite-polyurethane biofilm carrier had a loading of the zeolite of 0.15 g/cm³, and a loading of the waterborne polyurethane of 0.015 g/cm³; the specific structural schematic diagram is shown in FIG. 2.

Use Example

Figure 3A:
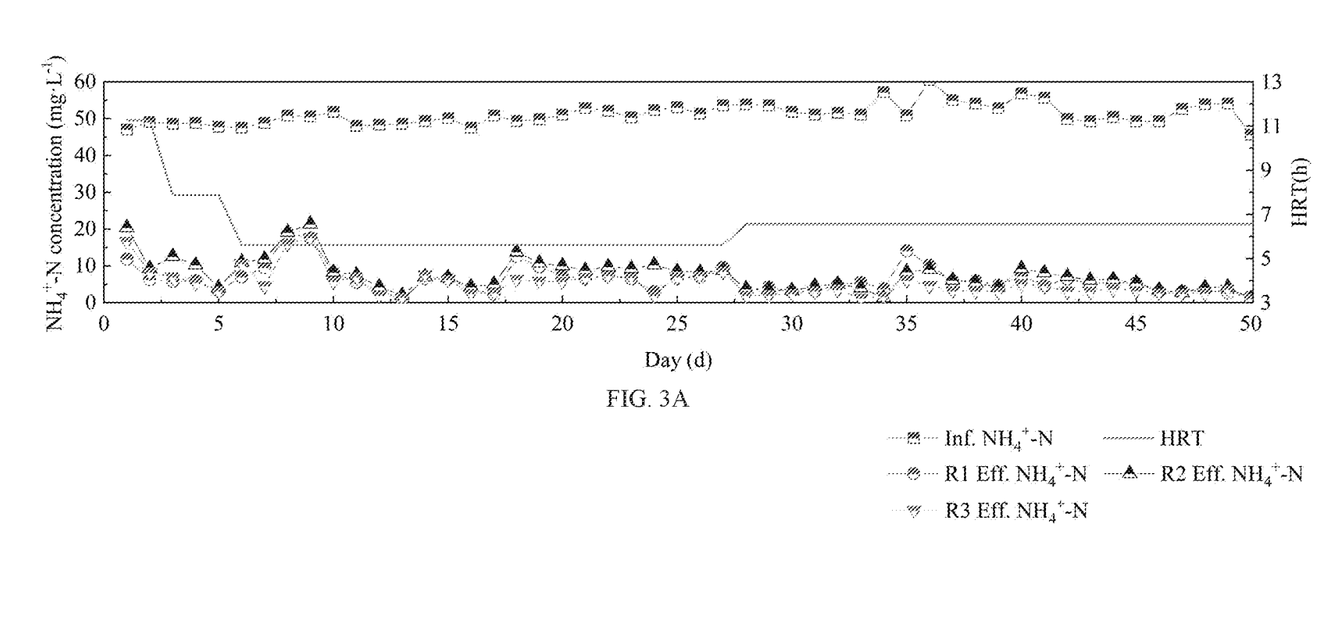
FIGS. 3A to 3D are graphs respectively showing the change trend of nitrogen removal efficiency of the conventional polyurethane carrier system (R1) in Comparative Example 1, the zeolite-polyurethane sponge carrier system (R2) in Comparative Example 2, and the novel biofilm composite carrier system (R3) in Example 1.
Figure 3B:
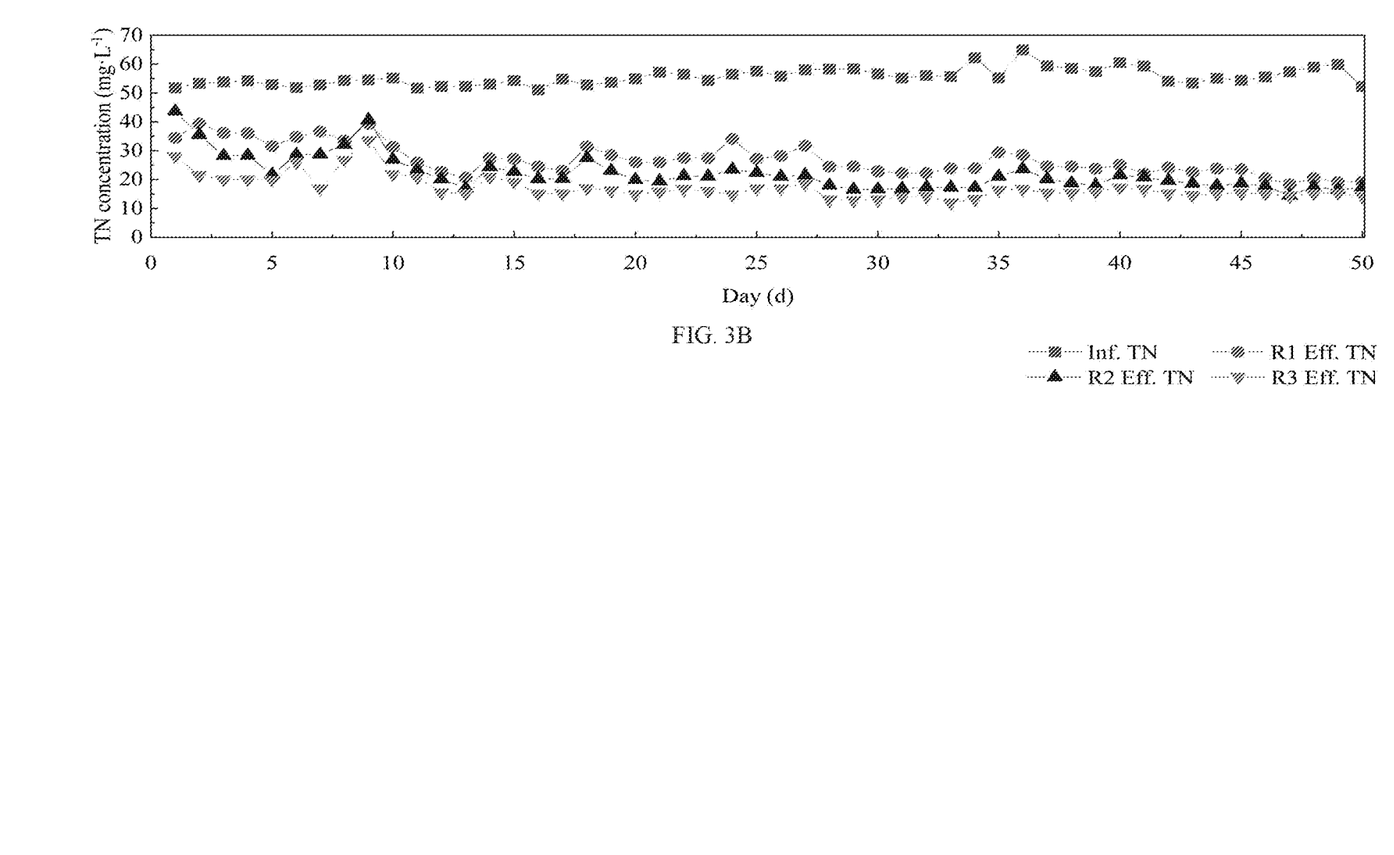
Figure 3C:
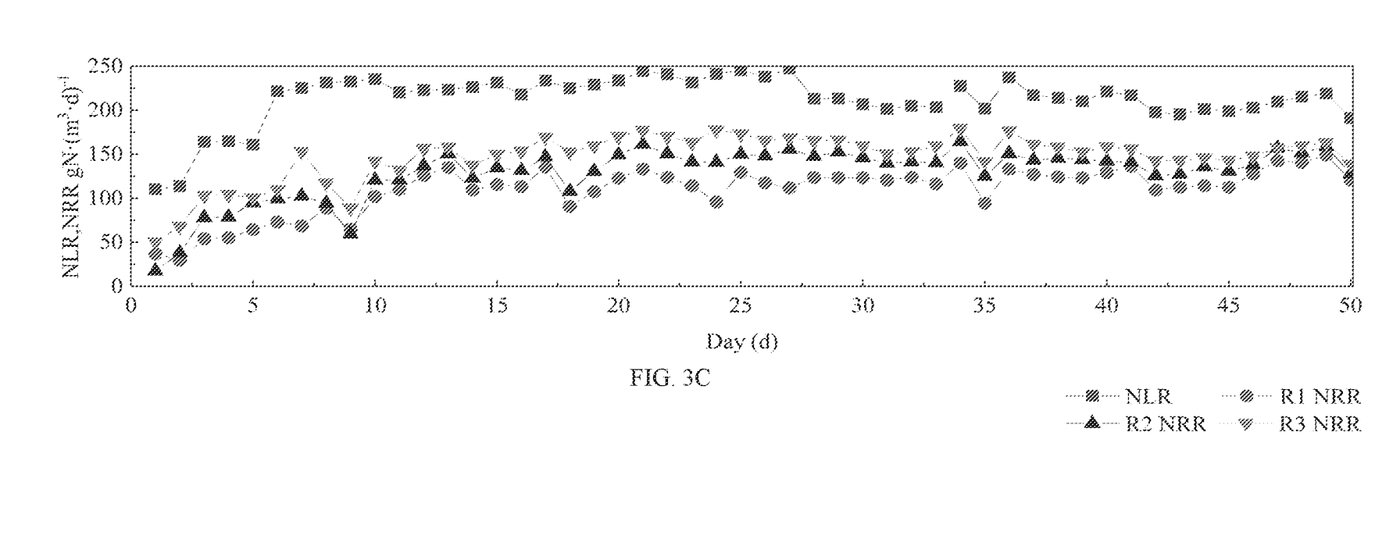
Figure 3D:
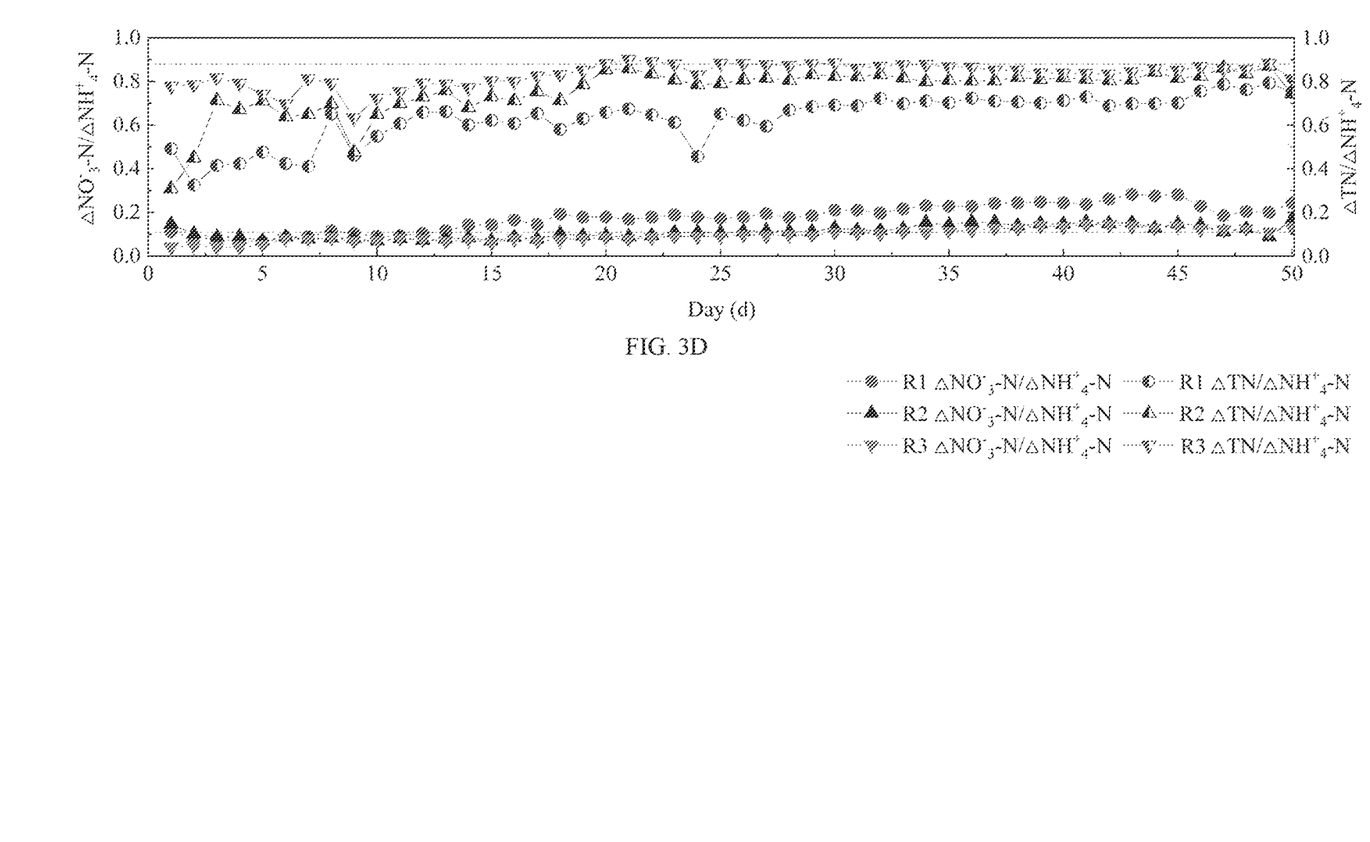

A deammonification system was constructed in an upflow packed bed reactor using the biofilm composite carriers prepared in the Examples 1-6, the treated polyurethane sponge obtained in the Comparative Example 1 and the biofilm composite carrier obtained in the Comparative Example 2 as fillers, which was specifically as follows:

Three identical upflow packed bed reactors were taken, wherein the reactor had a height of 39 cm, an inner diameter of 7 cm, a total capacity of 1.5 L and an effective capacity of 1.3 L. The biofilm composite carrier prepared in Example 1, the treated polyurethane sponge obtained in Comparative Example 1 and the zeolite-polyurethane biofilm obtained in Comparative Example 2 were placed in the three reactors respectively, and a reflux ratio was controlled at 5:1. The specific nitrogen removal conditions were as follows: an aeration was conducted for 4 min, and an aeration stopping was conducted for 26 min; an aeration rate was 6 mL/min; the outside of the reactor was wrapped up with black shading cloth, and further wrapped up with an electric blanket to maintain the temperature at 33±3° C.; a dissolved oxygen concentration was 0.1 mg $O_2 \cdot L^{-1}$, a pH was 8.0±0.3, an ammonium concentration of artificial municipal sewage was set to 50 mg $N \cdot L^{-1}$, a hydraulic retention time was 6.6 h, a total nitrogen loading rate of the influent was 0.2 kg $N \cdot (m^3 \cdot d)^{-1}$. The test results are shown in FIGS. 3A to 3D and FIGS. 4A to 4D. FIGS. 3A TO 3D are graphs respectively showing the change trend of nitrogen removal efficiency of the conventional polyurethane carrier system (R1) described in Comparative Example 1, the zeolite-polyurethane biofilm carrier system (R2) described in Comparative Example 2, and the novel biofilm composite carrier system (R3) of Example 1, i.e., FIG. 3A is a graph showing the variation of the nitrogen concentration of influent and effluent, FIG. 3B is a graph showing the variation of the total nitrogen concentration of influent and effluent, FIG. 3C is a graph showing the variation of nitrogen removal efficiency, and FIG. 3D is a graph showing the variation of deammonification stability, $INF \cdot NH_4^+$—N is the ammonium concentration of the artificial municipal sewage, and HRT is the hydraulic retention time. It can be seen from FIGS. 3A to 3D that the nitrogen removal efficiency of the conventional polyurethane carrier system (R1) in Comparative Example 1, the zeolite-polyurethane biofilm carrier system (R2) in Comparative Example 2, and the novel biofilm composite carrier system (R3) in Example 1 gradually increased to 0.14 kg $N \cdot (m^3 \cdot d)^{-1}$, 0.15 kg $N \cdot (m^3 \cdot d)^{-1}$, and 0.17 kg $N \cdot (m^3 \cdot d)^{-1}$, respectively. Compared with the other two systems, the novel biofilm composite carrier system (R3) is successfully started at 28 d, the ammonium concentration and the total nitrogen concentration of the effluent are 2.0 mg $N \cdot L^{-1}$ and 13.0 mg $N \cdot L^{-1}$, respectively. The total nitrogen removal efficiency and the total nitrogen removal rate reach 77.7% and 0.163 kg $N \cdot (m^3 \cdot d)^{-1}$, respectively.

Figure 4A:
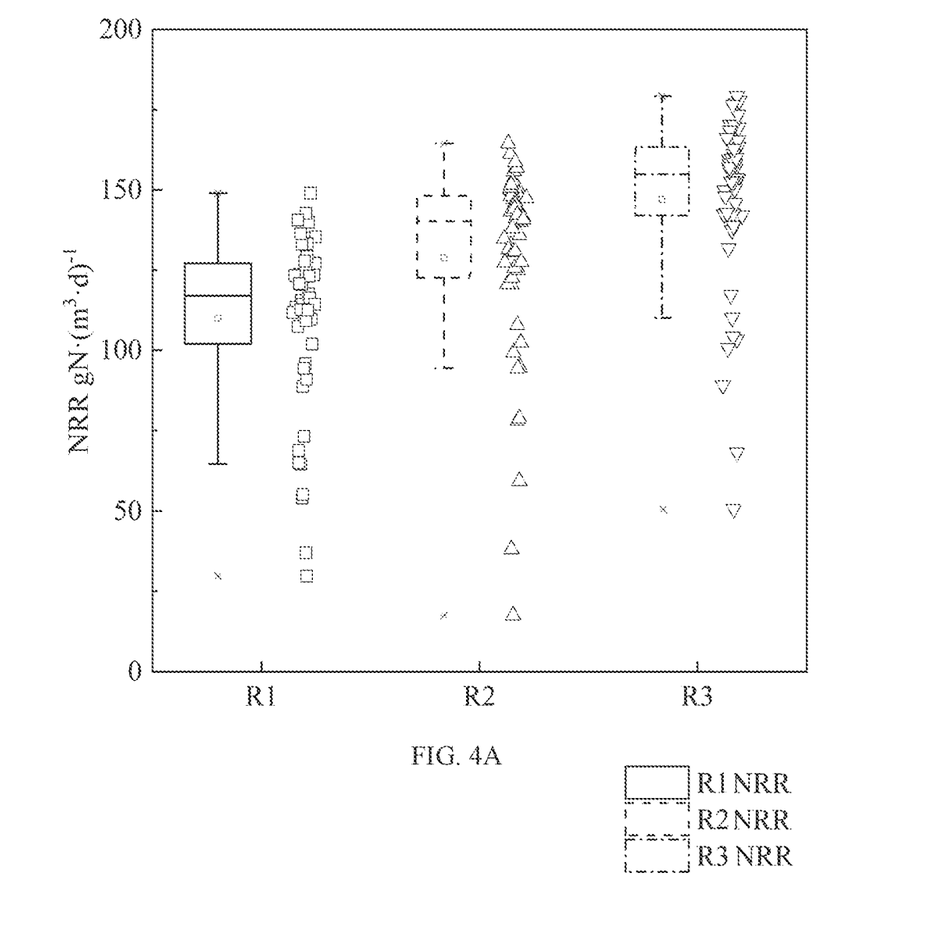
FIGS. 4A to 4D are graphs respectively showing the comparison of nitrogen removal efficiency and stability of the conventional polyurethane carrier system (R1) in Comparative Example 1, the zeolite-polyurethane sponge carrier system (R2) in Comparative Example 2, and the novel biofilm composite carrier system (R3) in Example 1.
Figure 4B:
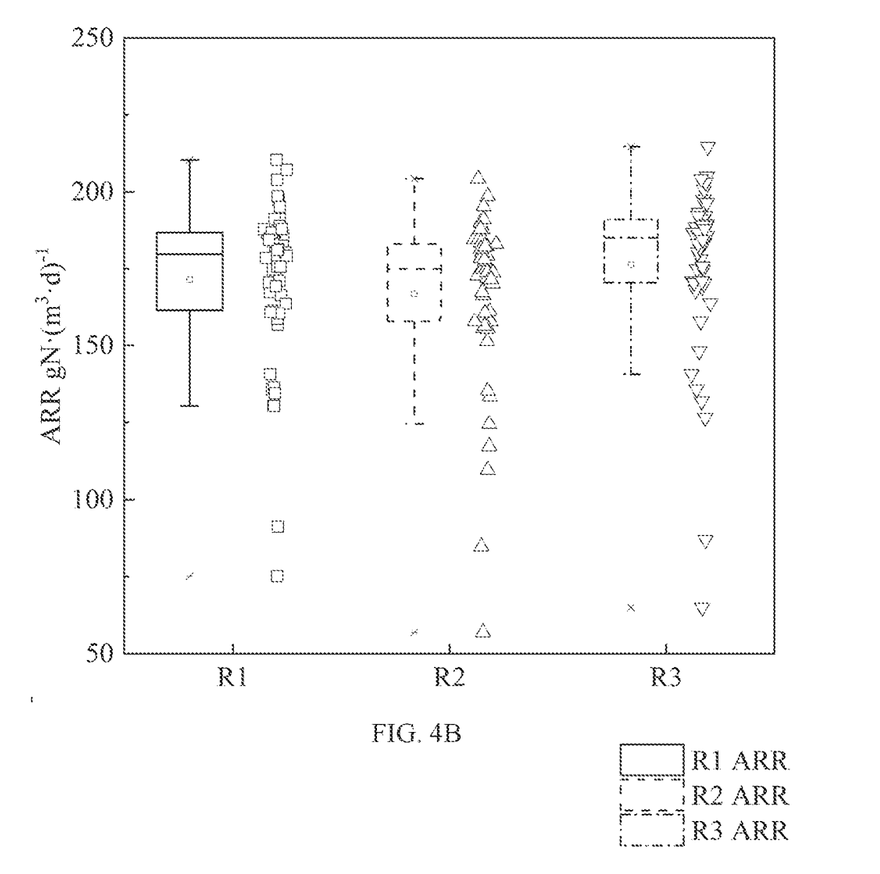
Figure 4C:
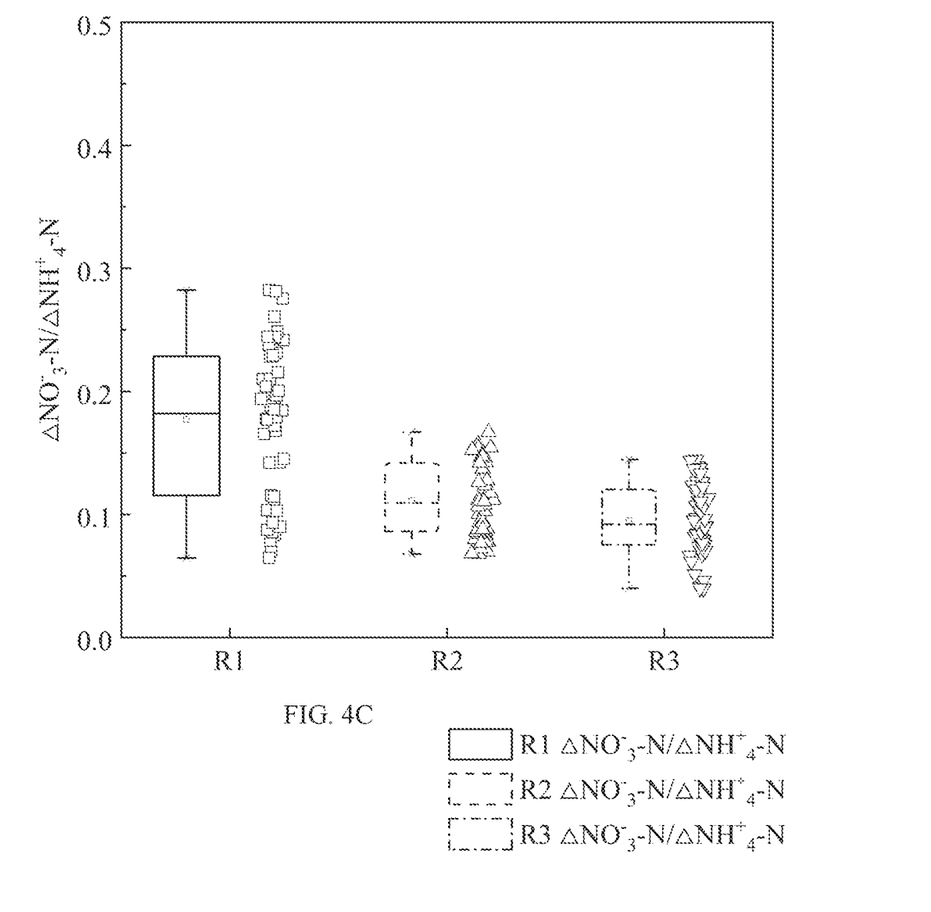
Figure 4D:
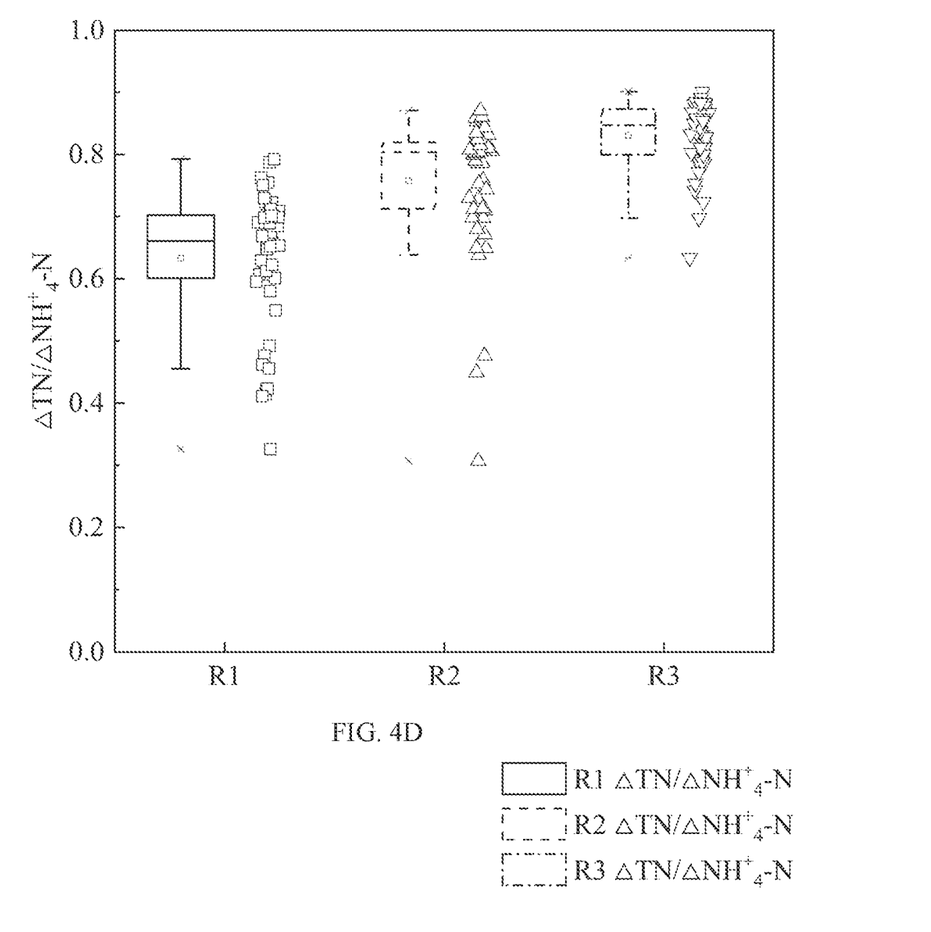

FIGS. 4A to 4D are graphs respectively showing the comparison of nitrogen removal efficiency and stability of the conventional polyurethane carrier system (R1) in Comparative Example 1, the zeolite-polyurethane biofilm carrier system (R2) in Comparative Example 2, and the novel biofilm composite carrier system (R3) in Example 1, i.e., FIG. 4A is a comparison diagram of total nitrogen removal rate, FIG. 4B is a comparison diagram of ammonium removal rate, FIG. 4C is a comparison diagram of $\Delta NO_3^-$—$N/\Delta NH_4^+$—N, and FIG. 4D is a comparison diagram of $\Delta TN/\Delta NH_4^+$—N. It can be seen from FIGS. 4A to 4D that the differences between the ammonium removal rates of the three systems are not particularly obvious, but in terms of the total nitrogen removal rate, the novel biofilm composite carrier system (R3) in Example 1 is the highest, and the zeolite-polyurethane biofilm carrier system (R2) in Comparative Example 2 is the second, and the conventional polyurethane carrier system (R1) in Comparative Example 1 is the lowest; it can be seen from the two ratios $\Delta TN/\Delta NH_4^+$—N and $\Delta NO_3^-$—$N/\Delta NH_4^+$—N that the ratios of the novel biofilm composite carrier system (R3) in Example 1 and the zeolite-polyurethane biofilm carrier system (R2) in Comparative Example 2 are closer to the theoretical ratios, and that of the novel biofilm composite carrier system (R3) is the most stable. The ammonium in the conventional polyurethane carrier system (R1) is mainly converted into nitrate through nitrification. Compared with the conventional polyurethane, the novel biofilm composite carrier and the Na-pretreated zeolite-polyurethane carrier have more positive influence on the anammox activity.

The effects of the novel biofilm composite carrier systems constructed by the biofilm composite carriers prepared in Examples 2-6 are similar to that of the novel biofilm composite carrier system constructed by the biofilm composite carrier prepared in Example 1.

The foregoing is only a preferred embodiment of the present disclosure, and it should be noted that, for those skilled in the art, various improvements and modifications could be made without departing from the principle of the present disclosure, and these improvements and modifications should also be considered as the protection scope of the present disclosure.

What is claimed is:

1. A biofilm composite carrier, comprising a polyurethane framework, an adhesive and a functional material, wherein
the polyurethane framework has a volume, a surface, and pores, the functional material is adhered to the surface and pores of the polyurethane framework through the adhesive, and the functional material is a mixture of zeolite and tourmaline, and a mass ratio of zeolite to tourmaline in the mixture of zeolite and tourmaline is in a range of (1-3):1.

2. The biofilm composite carrier of claim 1, wherein a ratio of the volume of the polyurethane framework to the mass of the adhesive to the mass of the functional material is in a range of 1 cm$^3$:(0.015-0.025) g:(0.1-0.2) g.

3. The biofilm composite carrier of claim 2, wherein the zeolite in the mixture of zeolite and tourmaline is Na-pretreated zeolite, and
the adhesive is waterborne polyurethane.

4. The biofilm composite carrier of claim 1, wherein the zeolite in the mixture of zeolite and tourmaline is Na-pretreated zeolite, and
the adhesive is waterborne polyurethane.

5. A method for preparing the biofilm composite carrier of claim 1, comprising steps of:
mixing a zeolite powder and a tourmaline powder to obtain a zeolite-tourmaline mixed powder;
mixing a portion of the zeolite-tourmaline mixed powder with an adhesive solution to obtain a functional carrier adhesive; and
placing the polyurethane framework in the functional carrier adhesive and impregnating, removing residual liquid from the polyurethane framework, then placing the polyurethane framework obtained after removing residual liquid in a remaining portion of the zeolite-tourmaline mixed powder, and adhering the zeolite-tourmaline mixed powder to obtain the biofilm composite carrier.

6. The method of claim 5, wherein the method further comprises subjecting the zeolite powder to a pretreatment before mixing the zeolite powder and the tourmaline powder, and the pretreatment comprises soaking the zeolite powder in a sodium chloride solution for an activation.

7. The method of claim 6, wherein the zeolite powder has a particle size of 200 to 800 meshes,
the sodium chloride solution has a temperature of 70-100° C., and the sodium chloride solution has a concentration of 1-1.5 mol/L, and
a ratio of the mass of the zeolite powder to the volume of the sodium chloride solution is in a range of (15-25) g:100 mL.

8. The method of claim 5, wherein the adhesive solution is a waterborne polyurethane solution,
the waterborne polyurethane solution has a concentration of 30±2% by mass, and
a mass ratio of the zeolite-tourmaline mixed powder to the waterborne polyurethane solution is in a range of 1:(5-10).

9. A method for using the biofilm composite carrier of claim 1 in the field of enhancing a municipal sewage deammonification system, comprising using the biofilm composite carrier as a filler for enhancing the municipal sewage deammonification system.

* * * * *